(12) United States Patent
Walter et al.

(10) Patent No.: US 7,089,992 B2
(45) Date of Patent: Aug. 15, 2006

(54) WINDOW SHADE WITH EXTRACTION SLOT COVER

(75) Inventors: Herbert Walter, Ebersbach (DE); Melf Hansen, Baltmannsweiler (DE)

(73) Assignee: BOS GmbH & Co. KG, Ostfildern (DE)

( * ) Notice: Subject to any disclaimer, the term of this patent is extended or adjusted under 35 U.S.C. 154(b) by 209 days.

(21) Appl. No.: 10/688,324

(22) Filed: Oct. 17, 2003

(65) Prior Publication Data

US 2004/0144506 A1 Jul. 29, 2004

(30) Foreign Application Priority Data

Oct. 17, 2002 (DE) ................... 102 48 591

(51) Int. Cl.
 *B60J 3/00* (2006.01)

(52) U.S. Cl. ............................... 160/370.22

(58) Field of Classification Search ........... 160/370.22, 160/370.21, 22, 24, DIG. 2, DIG. 3, DIG. 4; 296/97.7, 97.8, 97.9, 84.1, 143
See application file for complete search history.

(56) References Cited

U.S. PATENT DOCUMENTS

| 5,201,810 | A | 4/1993 | Ojima et al. |
| 6,213,186 | B1 * | 4/2001 | Torres et al. .................. 160/24 |
| 6,422,291 | B1 * | 7/2002 | Brunnert et al. ....... 160/370.22 |
| 6,547,307 | B1 * | 4/2003 | Schlecht et al. ........... 296/97.4 |
| 6,598,929 | B1 * | 7/2003 | Schlecht et al. ........... 296/97.4 |
| 6,796,599 | B1 * | 9/2004 | Schlecht et al. ............ 296/143 |

FOREIGN PATENT DOCUMENTS

| DE | 198 35 257 A1 | 2/2000 |
| DE | 100 05 951 A1 | 8/2001 |
| DE | 100 57 764 A1 | 6/2002 |
| EP | 1 099 579 A1 | 5/2001 |
| GB | 2 278 141 A | 11/1994 |

\* cited by examiner

*Primary Examiner*—David Purol
(74) *Attorney, Agent, or Firm*—Leydig, Voit & Mayer, Ltd.

(57) ABSTRACT

A window shade assembly for motor vehicles which has a pivotable cover provided on the slot through which the window shade is extendable and retractable. The cover is prestressed into an open position by an opening spring for enabling extraction of the window shade. The cover is closed by excess travel of a window shade actuating element that serves for moving a tension rod of the window shade to the extracted position.

14 Claims, 6 Drawing Sheets

WINDOW SHADE WITH EXTRACTION SLOT COVER

FIELD OF THE INVENTION

The present invention relates generally to window shades for motor vehicles, and more particularly to motor vehicle window shades that are automatically extendable and retractable.

BACKGROUND OF THE INVENTION

It is known to provide a motor vehicle window shade with a winding shaft rotatably supported underneath a rear window shelf of the vehicle, as disclosed in DE 102 37 231. The rear window shelf has a slot through which a strip-shaped window shade can be extracted. A tension rod of the window shade moves in guide rails that are arranged laterally along the motor vehicle window. The window shade is has a spring motor that biases the winding shaft in the wind-up direction for the window shade. Two elongated actuating thrust elements are guided in guide rails in a buckle-proof fashion.

A positive connection is provided between the thrust elements and the tension rod by means of two hooks. One hook is mounted on the tension rod, and the other hook is mounted on the thrust element. This makes it possible to transmit a thrust force, as well as a tensile force, onto the tension rod by means of the actuating thrust elements. After the strip-shaped window shade is completely retracted, the positive connection between the tension rod and the thrust element is separated under the guidance and control of a cam. It is mentioned in the aforementioned reference that an excess travel can be achieved in this fashion in order to actuate a cover for the slot of the window shade by means of the opposite end of the thrust elements.

A window shade for a rear window of a motor vehicle is described in DE 102 23 028, wherein the winding shaft is adjustably supported underneath the rear window shelf. The winding shaft is arranged within a housing that can be raised slightly above the level of the rear window shelf in order to extract the window shade. In this case, an extraction slot, through which the window shade is extracted, becomes visible.

A tension rod, the ends of which are guided in guide rails, also is fixed on the strip-shaped window shade in this case. The actuation of the tension rod is effected by means of two thrust elements similar to that described above, except that the thrust elements are inseparably connected to the tension rod. When the tension rod is completely retracted into the cassette, the cassette is lowered into the rear window shelf with the aid of the driving force generated by the thrust elements that act as tension means during the retraction.

OBJECTS AND SUMMARY OF THE INVENTION

It is an object of the present invention to provide a motor vehicle window shade in which actuation of the window shade and cover for the slot through which the window shade is extracted and retracted is relatively simple and more reliable operation.

In carrying out the invention, a window shade is provided which has a thrust element movable in a corresponding guide rail which is operatively coupled to the tension rod only in a thrust direction of movement. The connection between the thrust element and the tension rod is not designed for transmitting a tensile force since the window shade is retracted exclusively with the aid of a spring motor contained in the winding shaft or another separate driving device that cooperates with the winding shaft. During window shade retraction, the tension rod is only able to move in the direction of the winding shaft under the influence of the spring motor to the degree permitted by the retraction movement of the thrust elements. In this respect, the thrust elements only can be subjected to a thrust force. Due to these measures, an excess travel of the thrust element at the end of the retraction movement of the strip-shaped window shade can easily be accommodated and used for closing the cover.

The cover is closed with a cam that is provided on the thrust element and cooperates with an actuating arm of the cover, wherein said cam closes the cover against the force of an opening spring. Alternatively, the excess travel causes the other end of the actuating thrust element to cooperate with the cover in order to move the cover into the closed position. Both variations provide certain advantages:

In the first variation, the storage tube that accommodates the rear section of the thrust element can be installed arbitrarily. This requires a cam that protrudes out of the guide rail, which under some circumstances might be considered unsightly. The additional cam is eliminated in the other variation such that no additional modifications need to be made to the thrust element. However, the free end of the storage tube should extend back to the cover such that a corresponding actuation thereof can be achieved. In this case, it is particularly advantageous that the thrust element be protected from buckling during the actuation of the cover by a telescopic sleeve.

Other objects and advantages of the invention will become apparent upon reading the following detailed description and upon reference to the drawings, in which:

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE DRAWINGS

Figure 1:
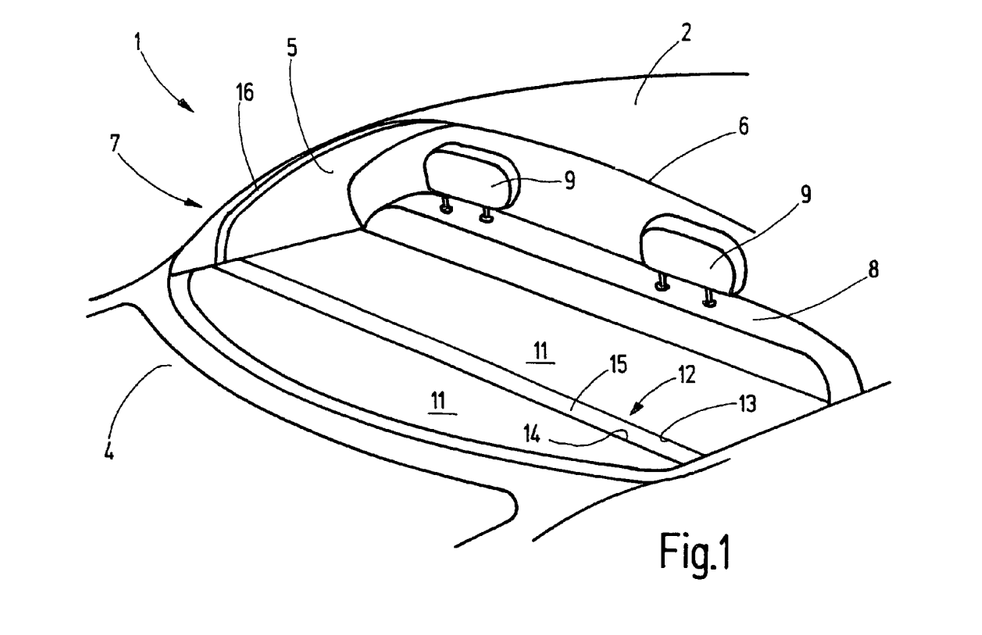
FIG. 1 is a diagrammatic depiction of part of a motor vehicle having a rear window shade in accordance with the invention, in this instance shown in a retracted position.

Referring now more particularly to FIG. 1 of the drawings, there is shown the rear section 1 of a motor vehicle, in this case a notchback sedan, having a rear window shade in accordance with the invention. The illustrated motor vehicle has a roof 2, a trunk lid 4 and C-shaped columns 5 with an interior liner between the trunk lid and roof, with the left C-Column being shown in the drawing. A rear window 7 is located between the C-columns 5, a rear edge 6 of the roof 2 and an upper side of the trunk. A rear window shelf 11 extends between a lower edge of the rear window 7 and the back of a rear bench seat 8, which in this case is provided with head rests. A slot 12 defined by parallel edges 13, 14 extends transversely through the rear window shelf 11. The slot 12 is closed by a cover 15 which is positioned between the C-columns 5.

Figure 2:
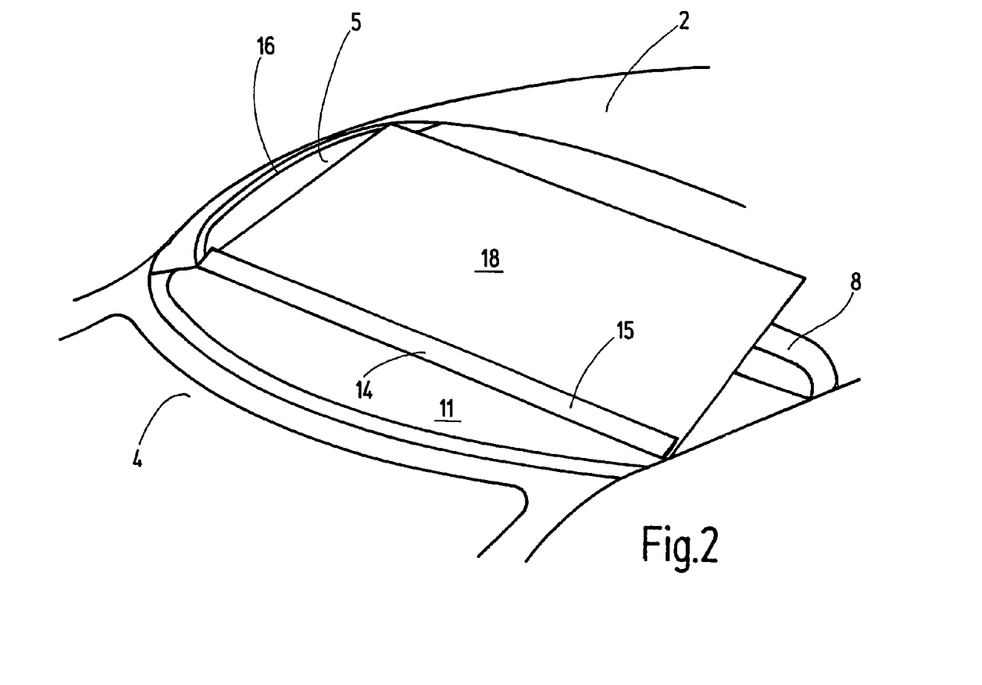
FIG. 2 is a diagrammatic depiction, similar to FIG. 1, showing the rear window shade in an extracted or extended position adjacent the rear window of the motor vehicle.

The actuating mechanism for the window shade 17 is arranged underneath the slot 12, which is closed by the cover 15 when the window shade is in a retracted condition, as shown in FIG. 1. The cover 15 is pivotable upwardly in order to uncover the slot 12 and to permit extraction of the window shade from the slot, as depicted in FIG. 2. Guide rails 16 are provided in the interior liner of the C-columns, beginning at the elevation of the slot 15 and following the lateral contour of the rear window opening up the vicinity of the roof (2).

Figure 3:
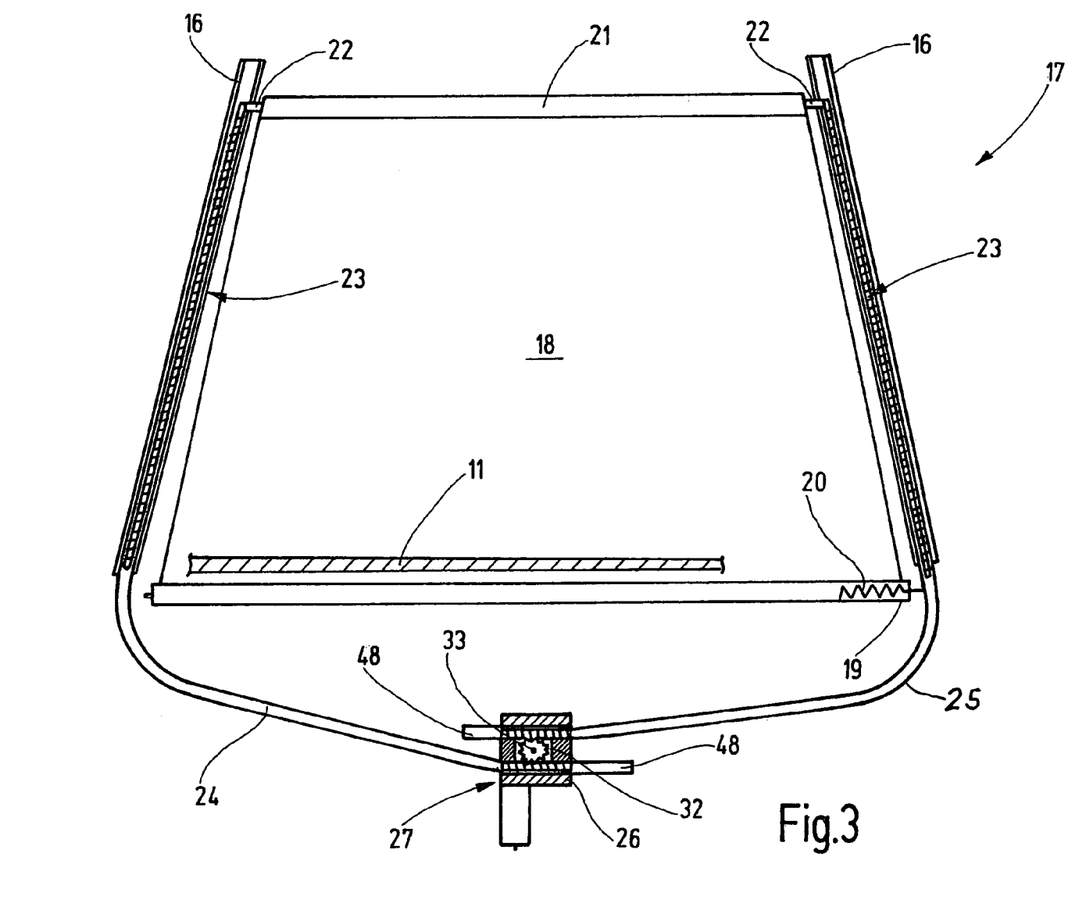
FIG. 3 is a diagrammatic depiction of the actuating mechanism for the illustrated window shade.

The illustrated window shade assembly, as depicted in FIG. 3, comprises a strip-shaped window shade 18 affixed at one end to a winding shaft 19. The other end of the window shade 18 opposite the winding shaft 19 is connected to a tension rod assembly 21. The winding shaft is biased in a wind-up direction of the window shade 18 onto the winding shaft 19 by means of a spring motor 20 arranged within the winding shaft 19.

The tension rod assembly 21 essentially includes two telescopically movable guide elements 22. The telescopically movable guide elements 22 serve for compensating the varying distance between the two guide rails 16 that are embedded in the interior liner of the C-columns 5 of the window 6 within the motor vehicle.

Figure 4:
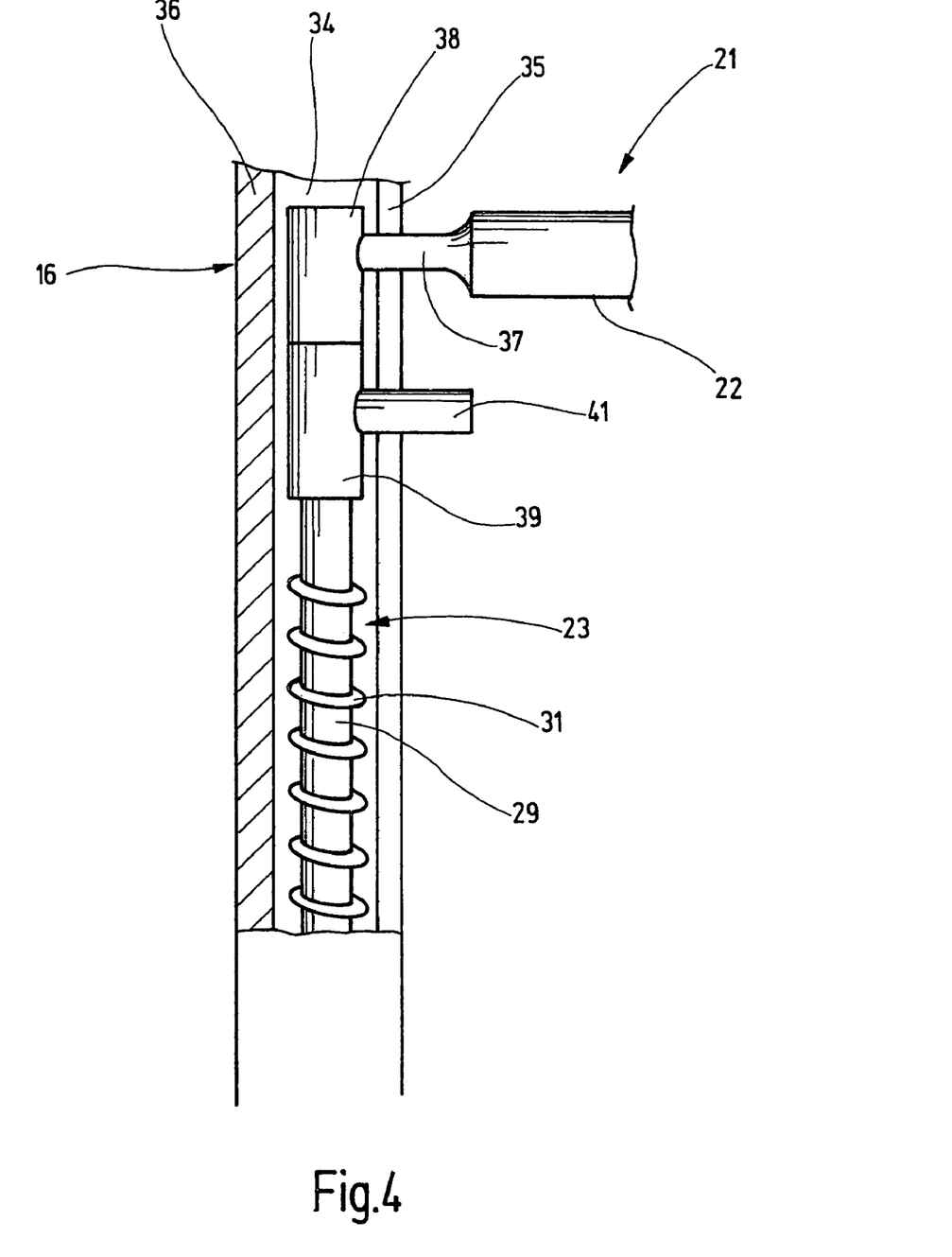
FIG. 4 is an enlarged fragmentary section of the connection between a tension rod of the window shade a thrust element of the window shade actuating mechanism.

The actuating mechanism for the window shade includes actuating elements 23 that are guided in a buckle-proof fashion in the guide rails 16. The guide rails 16 continue underneath the rear window shelf 11 in guide tubes 24, 25, by means of which the guide elements 23 are coupled to a housing 26 of a gear motor 27. The actuating elements 23, which can be longitudinally displaced in the guide rails 16, as well as the connecting tubes 24, 25, consist of elongated flexible elements such as the cores of Bowden cables as depicted in FIG. 4, each actuating element 23 comprises a compression-proof, cylindrical core element 29, the outside of which is provided with a screw-like rib 31 which defines a helical gear rack. With the aid of the rib 31, the actuating elements 23 mesh with a gearwheel 32 fixedly mounted on an output shaft 33 of the gear motor 27. The two actuating elements 23 tangentially extend past the gearwheel 32 on opposite sides such that they are synchronously moved in opposite directions.

The two guide rails 16, as illustrated in FIG. 4, each consists of a tube with a guide groove 34 that opens outwardly in the form of a guide slot 35 on one side. The guide rail forms a back 36 on the opposite side. Appropriate mounting flanges may be integrally formed onto the guide rail 16.

A tapered neck section 37 of the guide element 22 protrudes through the guide slot 35. The free end of the neck section 37 carries a cylindrical guide member 38 that fits into the cylindrical part of the guide groove 34 with slight play such that it cannot become jammed.

A cap 39 that can also be displaced in the cylindrical part of the guide groove 34 with slight play is fixed on the free end of the actuating element 23. A limit stop pin 41 laterally protrudes from the cap 39 and extends outwardly through the guide slot 35. Due to this arrangement, the pin 41 is only slightly, but distinctively spaced apart from the guide element 22.

Figure 5:
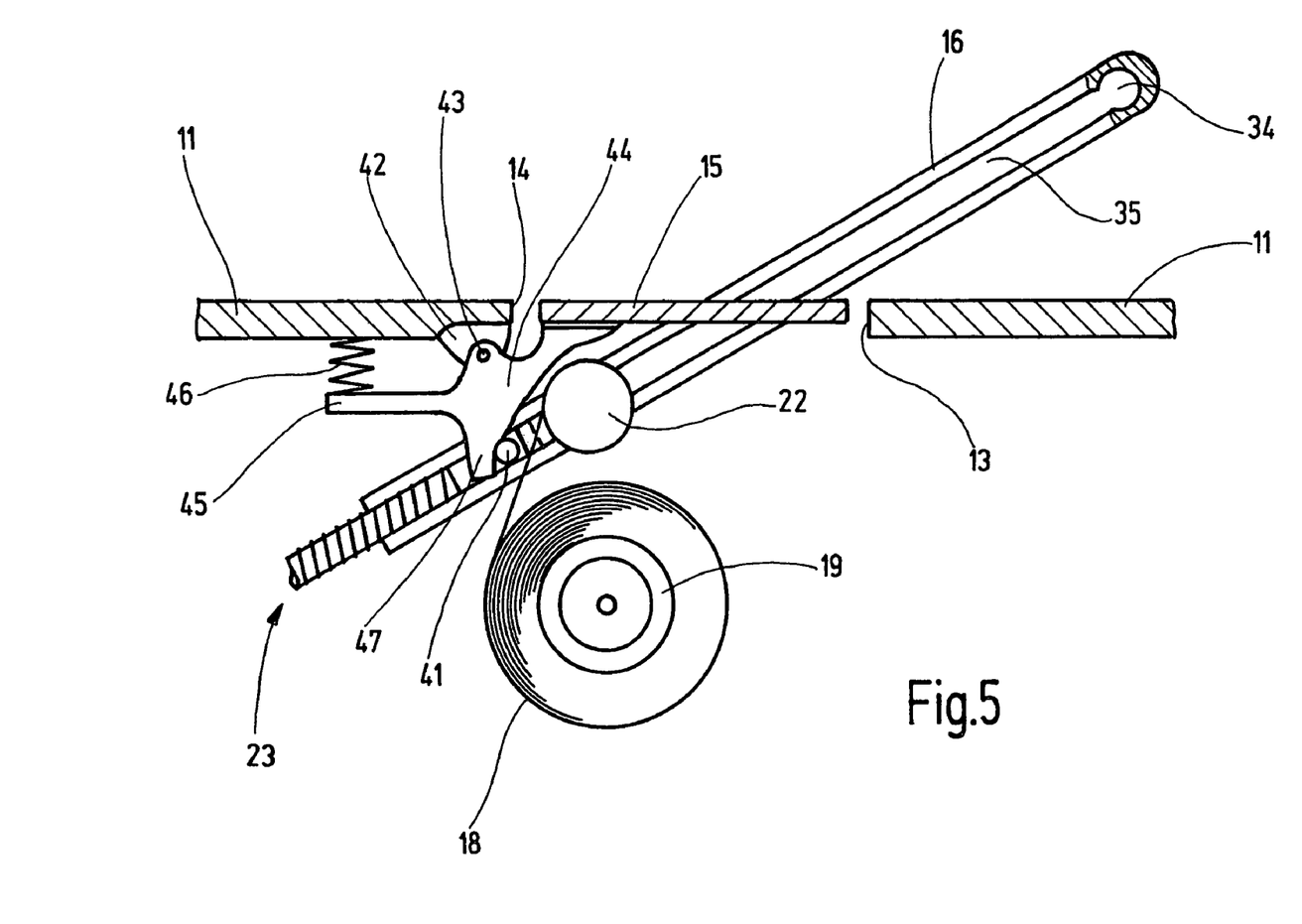
FIG. 5 is an enlarged fragmentary section showing interaction of the actuating mechanism thrust element with a cover of the rear window shade for moving the cover 6 in a closed position.
Figure 6:
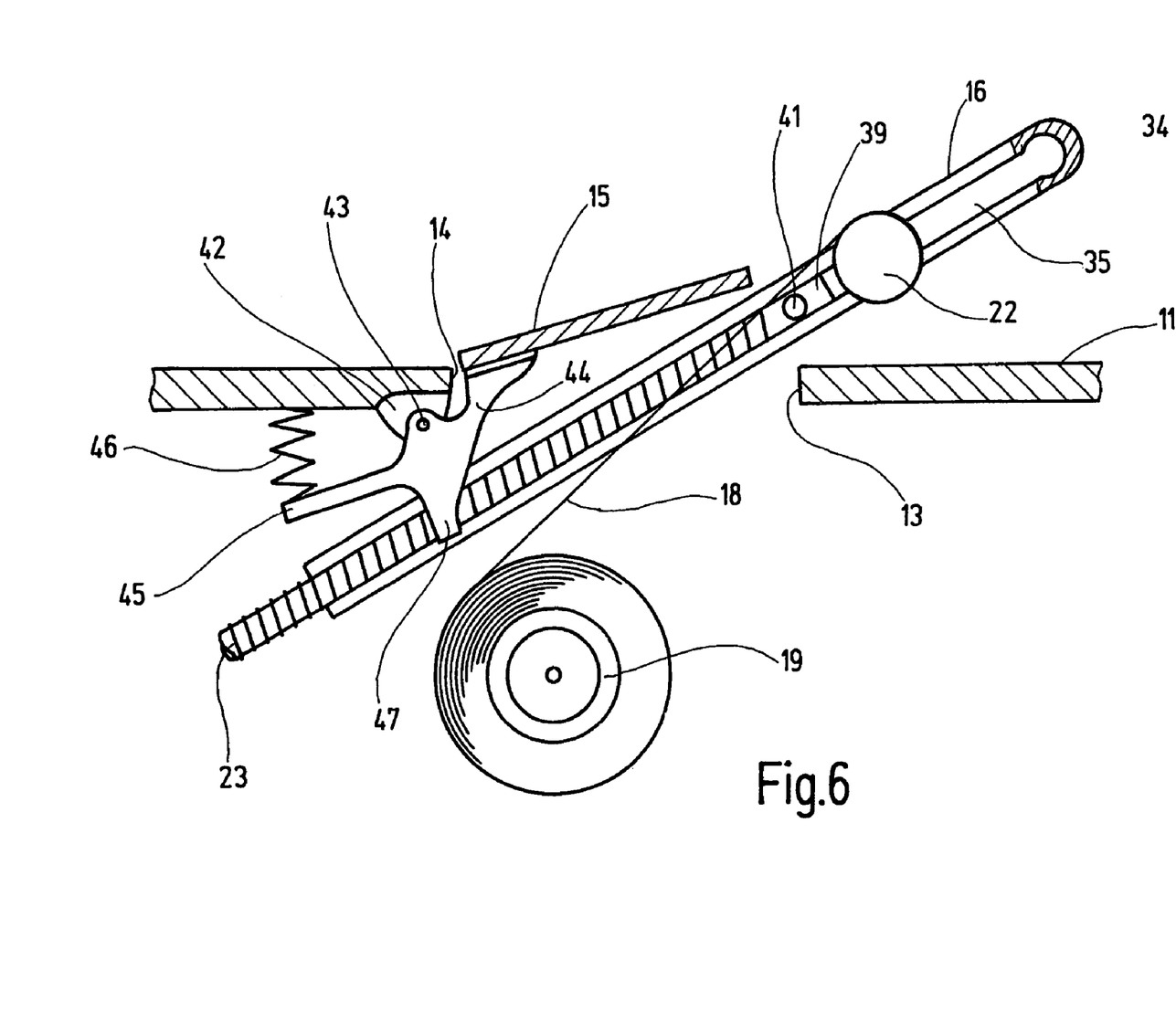
FIG. 6 is an enlarged fragmentary section, similar to FIG. 5, showing the cover for the rear window shade in an open position.

In accordance with an important aspect of the invention, the actuating elements 23 are separable from the guide element 22 of the window shade tension rod during retractable movement of the window shade into the slot and are operable for closing the cover 15. The support for the cover 15 and its actuating means are depicted in FIGS. 5 and 6. While FIGS. 5 and 6 show the left side of the motor vehicle, it will be understood that the right side is constructed in mirror image fashion. Consequently, it suffices to limit the description to the coupling of the cover 15 on the left side of the motor vehicle.

In the illustrated embodiment, the rear window shelf 11 carries a downwardly protruding hinged bracket 42 adjacent to the slot edge 14 on the respective ends of the slot, wherein said hinged bracket is connected in an articulated fashion to a second hinged bracket 44 by means of a hinge bolt 43, which lies parallel to the longitudinal axis of the winding shaft 19. The hinged bracket 44 is rigidly connected to the underside of the cover 15.

Such hinge mountings on both ends of the cover 15 make it possible to pivot the cover about an axis parallel to the winding shaft 19 such that the cover can be moved from the slot closing position shown in FIG. 1 to the position shown in FIG. 2, in which the slot is open.

The hinged bracket 44 extends beyond the hinge bolt 43 in the form of an arm 45 that has clearance along the underside of the rear section of the rear window shelf 11. A pressure spring 46 that serves to prestress the cover 15 into the open position is arranged between the rear section of the rear window shelf 11 and the arm 45. It will be appreciated that appropriate limit stops may be provided for limiting the open position of the cover. Another arm 47 of the hinged bracket 44 protrudes downwardly adjacent the guide slot 35 in such a way that the driving pin 41 is engagable with the arm 47, as indicated in FIG. 5.

The above arrangement functions as follows:

The strip-shaped window shade 18 is retracted by driving the gear motor 27 in such a direction that the two actuating elements 23 are pulled back in the guide rails 16 with the aid of the gearwheel 32. At the end of the retraction movement, the driving pin 41 comes in contact with the arm 47 of the hinged bracket 44 and pivots the arm 47, and consequently the cover 15, into the position shown in FIG. 5, in which it covers the slot 12. During this process, the tension rod 21 may be drawn into contact with an appropriate limit stop, such as the outer circumference of the strip-shaped window shade 18 that this wound up on the winding shaft 19. The strip-shaped window shade 18 is wound up on the winding shaft 16 with the aid of the spring motor 20 that constantly tends to turn the winding shaft 16 in the wind up direction.

The guide member 38 and the cap 39 that carries the driving pin 41 only cooperate in the thrust direction. Since no tensile forces are transmitted by the actuating element 23, each actuating element 23 is able to separate from the tension rod 21 during the retraction when the latter comes in contact with a limit stop, wherein the excess travel of the actuating element is used for closing the cover 15.

The strip-shaped window shade 18 is extracted from the position shown in FIG. 5 by turning the gear motor 27 in such a way that it pushes the two actuating elements 23 forward in both guide rails 16 in a synchronous fashion. During the course of this forward movement, the driving pin 41 is moved in the direction of the cover 15. The hinged bracket 44 is able to pivot about the hinge bolt 43, enabling the spring 46 to move the cover 15 into the open position shown in FIG. 6. During the course of the forward movement, the cap 39 also comes in contact with the guide element 38 and thereby pushes the tension rod 21 away from the winding shaft 19 at the respective end. In the situation shown in FIG. 6, the cover 15 is open and the tension rod 21 is situated slightly above the upper side of the rear window shelf 11.

It can be seen from the foregoing that the cover 15 is opened with the aid of the pressure spring 46, while the closing movement is effected through movement of the actuating projection 41 that tangentially cooperates with the actuating arm 47 to move the hinged bracket 44 and cover 15 about the hinge bolt 43. While the cover is actuated on both ends in the illustrated embodiment, it will be understood that it also is possible to actuate the cover from one end.

Figure 7:
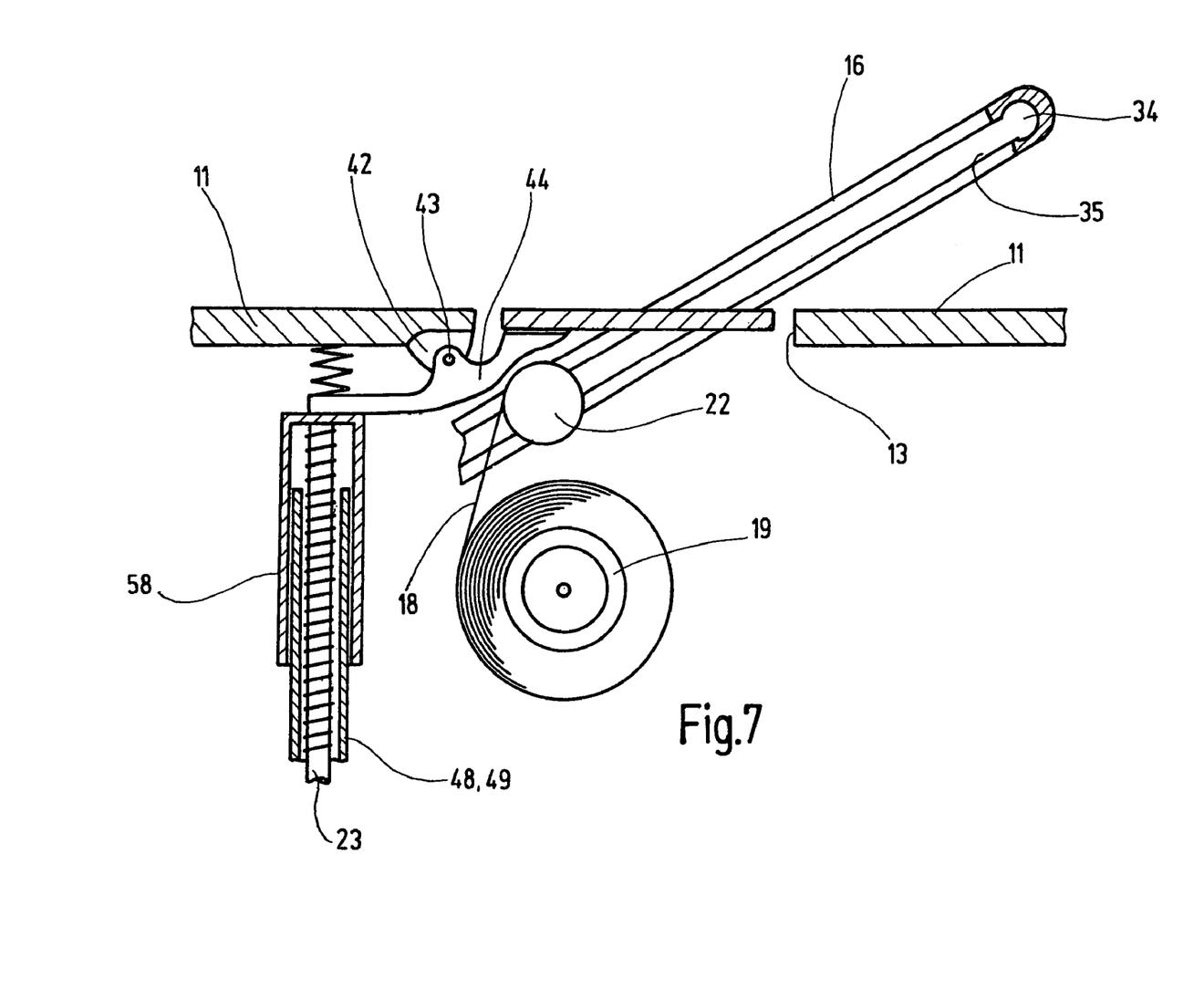
FIG. 7 is an enlarged fragmentary section of an alternative embodiment of actuating arrangement for opening and closing the rear window shade cover.

FIG. 7 shows an alternative embodiment in which the end of each actuating element 23 that is situated distant from the tension rod arrangement 21 is used for closing the cover rather than the adjacent end. In contrast to the previously described embodiment, this arrangement does not include an actuating pin 41. In addition, the storage tubes 48, 49 which in FIG. 3 serve to protect the respectively unused sections of the actuating elements 23 are installed in such a way in FIG. 7 that their ends are situated in the vicinity of the hinged bracket 44.

A cap 58 is telescopically placed over the respective free ends of the storage tubes 48, 49 such that it can be freely displaced along the outside of the storage tubes 48 and 49. The cap 51 serves for protecting the actuating element 23 from buckling when it emerges from the free end of the respective storage tubes 48, 49, as shown in FIG. 7.

This embodiment functions similar to the previously described embodiment. When retracting the strip-shaped window shade 18, the actuating elements 23 are pulled back and pushed into the respective storage tubes 48, 49. The movement of the tension rod 21 along the guide rails 16 ceases as soon as the assembly comes in contact with a corresponding limit stop. However, the actuating elements 23 continue their movement and separate from the guide elements 38. Their other ends emerge from the ends of the respective storage tubes 48, 49, as shown in FIG. 7, and push the cap 58 in the direction of the arm 45 such that the cover 15 which was previously held in the open position under the influence of the pressure spring 46 is closed.

From the foregoing, it can be seen that a window shade for motor vehicles is provided which has a pivoted cover adjacent extraction slot in order to cover the slot when the window shade is retracted. The cover is biased into an open position by an opening spring and is closed with the excess travel of the actuating element that effects movement of the tension rod.

What is claimed is:

1. A window shade assembly (17) for motor vehicles, comprising at least one winding shaft (19) rotatably supported in concealed relation below a covering (11) in the motor vehicle, a strip-shaped window shade (18) having one end fixed to said winding shaft (19) and being extractable and retractable through a slot (12) in said covering (11), a cover (15) movable between an open position for enabling extraction and retraction of said window shade (1) and a closed position at least partially closing said slot when said window shade is retracted, a guide (16) laterally adjacent at least one side of said window shade (18), said guide (16) having at least one guide groove (34), a tension rod (21) connected to said window shade (18) on a distant edge with respect to said winding shaft (19), said tension rod (21) having at least one guide member (38) guided in the guide groove (34) of said guide (16) during extracting and retracting movement of said window shade (18), a flexible elongated actuating element (23) moveable in said guide groove (34), at least one drive (20, 27) for displacing the actuating element (23) along the guide groove (34) and for turning said winding shaft (19), said actuating element (23) being operable to act upon and move said tension rod (21) in a thrust direction of movement of the tension rod which extracts said window shade (18) from said slot, said actuating element (23) being operable as an incident to movement in an opposite window shade retracting direction for permitting retraction of said window shade into said slot (12), and said actuating element being operable as an incident to an over travel segment of movement in the retracting direction separate from and relative to said tension rod for positively moving said cover to said closed position following retraction of the window shade into said slot.

2. The window shade assembly of claim 1 in which said covering (19) is a rear window shelf of the motor vehicle, and said slot (12) is formed in said shelf.

3. The window shade of assembly of claim 1 in which said cover (15) is pivotally supported on underside of said covering (11) out of view of an observer in said motor vehicle.

4. The window shade assembly of claim 1 in which said cover (15) is mounted for pivotal movement about an axis parallel to a rotary axis of said winding shaft (19).

5. The window shade assembly of claim 1 in which said cover (15) has an actuating arm (45, 47) that cooperates with said actuating element (23) during movement of said window shade to a retracted position to move said cover.

6. The window shade assembly of claim 1 in which said actuating element (23) is in the form of a flexible rack.

7. The window shade assembly of claim 1 in which said actuating element (23) has one end operable for cooperating with the tension rod (21) and an opposite end for cooperating with the cover (15).

8. The window shade assembly of claim 1 in which said actuating element (23) has one end that is operable for cooperating with the tension (21) and a portion adjacent said one end for cooperating with the cover (15) for moving the cover.

9. The window shade assembly of claim 1 including an anti-buckling device (51) adjacent said flexible actuating element (23) for preventing buckling of said actuating element.

10. The window shade assembly of claim 1 in which said winding shaft (19) has a spring drive, and said window shade (18) is moveable in a retracting direction under the power of said winding shaft spring drive as an incident to movement of said actuating element (23) in said window shade retraction direction.

11. A window shade assembly (17) for motor vehicles, comprising at least one winding shaft (19) rotatably supported in concealed relation below a covering (11) in the motor vehicle, a strip-shaped window shade (18) having one end fixed to said winding shaft (19) and being extractable and retractable through a slot (12) in said covering (11), a cover (15) movable between an open position for enabling extraction and refraction of said window shade (1) and a closed position at least partially closing said slot when said window shade is retracted, a biasing member for forcing said cover in an opening direction, a guide (16) laterally adjacent at least one side of said window shade (18), said guide having at least one guide groove (34), a tension rod (21) connected to said window on a distant edge with respect to said winding shaft (19), said tension rod (21) having at least one guide member (38) guided in the guide groove (34) of said guide (16) during extracting and retracting movement of said window shade, a flexible elongated actuating element (23) moveable in said guide groove (34), at least one drive (20, 27) for displacing the actuating element (23) along the guide groove (34) and for turning said winding shaft (19), said actuating element (23) being operable as an incident to movement in a first direction for moving said tension rod (21) in a direction that extracts said window shade (18) from said slot and permits said biasing member to urge said cover to said open position, and said actuating element (23) being operable as an incident to movement in a second direction that permits retraction of said window shade into said slot and which positively moves said cover to said closed position against the force of said biasing member.

12. The window shade assembly of claim 11 in which said biasing member is a spring.

13. A window shade assembly (17) for motor vehicles, comprising at least one winding shaft (19) rotatably supported in concealed relation below a covering (11) in the motor vehicle, a strip-shaped window shade (18) having one end fixed to said winding shaft (19) and being extractable and retractable through a slot (12) in said covering (11), a cover (15) movable between an open position for enabling extraction and retraction of said window shade (1) and a closed position at least partially closing said slot when said window shade is retracted, a spring (46) for biasing said cover (15) into said open position, a guide (16) laterally adjacent at least one side of said window shade (18), said guide having at least one guide groove (34), a tension rod (21) connected to said window on a distant edge with respect to said winding shaft (19), said tension rod (21) having at least one guide member (38) guided in the guide groove (34) of said guide (16) during extracting and retracting movement of said window shade, a flexible elongated actuating element (23) moveable in said guide groove (34), at least one drive (20, 27) for displacing the actuating element (23) along the guide groove (34) and for turning said winding shaft (19), said actuating element (32) being operable to act upon and move said tension rod (21) only in a thrust direction of movement of the tension rod which extracts said window shade (18), and said actuating element (23) being operable for directly moving the cover (15) as an incident to movement of the actuating element (23).

14. A window shade assembly (17) for motor vehicles, comprising at least one winding shaft (19) rotatably supported in concealed relation below a covering (11) in the motor vehicle, a strip-shaped window shade (18) having one end fixed to said winding shaft (19) and being extractable and retractable through a slot (12) in said covering (11), a cover (15) movable between an open position for enabling extraction and retraction of said window shade (1) and a closed position at least partially closing said slot when said window shade is retracted, a guide (16) laterally adjacent at least one side of said window shade (18), said guide having at least one guide groove (34), a tension rod (21) connected to said window shade on a distant edge with respect to said winding shaft (19), said tension rod (21) having at least one guide member (38) guided in the guide groove (34) of said guide (16) during extracting and retracting movement of said window shade, a flexible elongated actuating element (23) moveable in said guide groove (34), at least one drive (20, 27) for displacing the actuating element (23) along the guide groove (34) and for turning said winding shaft (19), said actuating element (32) having one end that is operable to act upon and move said tension rod (21) only in a thrust direction of movement of the tension rod which extracts said window shade (18), and said actuating element (23) having a driving pin (41) protruding outwardly of said guide groove (34) for cooperating with and directly moving said the cover (15) as an incident to movement of the actuating element (23).

* * * * *